Nov. 16, 1965    A. AST    3,217,820
WEIGHING APPARATUS WITH UPPER BOWL
Filed July 6, 1964    2 Sheets-Sheet 1

Inventor:
Adolf Ast
By Werner W. Kleeman
His Attorney

Nov. 16, 1965 A. AST 3,217,820
WEIGHING APPARATUS WITH UPPER BOWL
Filed July 6, 1964 2 Sheets-Sheet 2

Inventor:
Adolf Ast
By Werner W. Kleeman
His Attorney

United States Patent Office 3,217,820
Patented Nov. 16, 1965

3,217,820
WEIGHING APPARATUS WITH UPPER BOWL
Adolf Ast, Messstetten, Germany, assignor to
August Sauter K.G., Ebingen, Germany
Filed July 6, 1964, Ser. No. 380,386
Claims priority, application Germany, July 10, 1963,
S 86,084
11 Claims. (Cl. 177—236)

The present invention relates to an improved balance or weighing apparatus provided with an upper bowl, such weighing apparatus further being of the type possessing a bowl carrier supported at a balance beam guided by means of flexible guides secured to a roll-off or roller element of the housing and a roll-off or roller element of the bowl carrier.

With a known balance or weighing device of this type the roll-off or roller elements consist of pins possessing relatively small diameter. The bending of the guide is, therefore, not without influence upon the measuring accuracy. Also, variations in length influence the measuring accuracy because no guarantee exists that the guide remains parallel to the knife or blade line.

It is, therefore, a primary object of the present inveniton to provide an improved weighing apparatus of the mentioned type which fulfills all requirements made upon a precision balance, and with regard to accuracy approaches the accuracy of an analytical or chemical balance.

Another important object of the present invention relates to the provision of an improved weighing apparatus which is relatively simple in construction yet highly reliable in operation.

An essential feaure of the present invention resides in the fact that, the roll-off or roller elements are sectors of a curved piece or member. As a result, it is possible to employ roller curves of relatively large diameter without the balance requiring too large space. If the bowl or pan is displaced to one side with respect to the bowl carrier, then it is possible to work with a guide which is only subjected to tension. If, however, the bowl is arranged approximately symmetrical to the bowl carrier then in accordance with a further aspect of the invention each roll-off or roller element can be associated with a counter-guide which rolls-off opposite to the previously mentioned guide, and the free ends of which are secured to a spanning or suspension member.

The parallelism between guide and knife line remains intact also with elongation of the guide if the center point of the roller curve of the roller element of the upright or stand lies at the fulcrum of the supporting knife edge and the center point of the roller curve of the roller element of the bowl carrier lies at the fulcrum of the load knife edge of the balance beam.

With band-shaped guides there appears with time a balance inaccuracy due to dust deposit upon the band. Thus, in accordance with a further very important feature of the invention the guides, therefore, consist of thin wires of optional cross-section, preferably round or circular cross-section.

Other features, objects and advantages of the invention will become apparent by reference to the following detail description and drawings in which.

Figure 2:
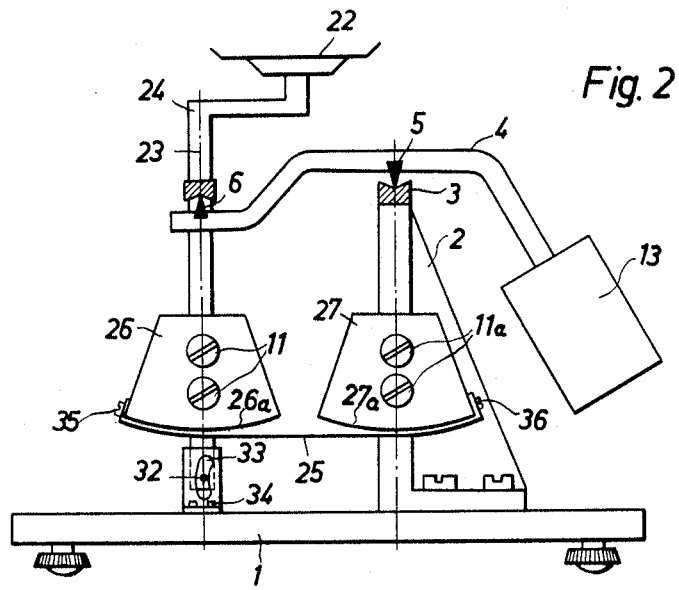
FIGURE 2 is a schematic representation in front view of a further embodiment of weighing apparatus designed according to the invention and provided with tension guides.
Figure 3:
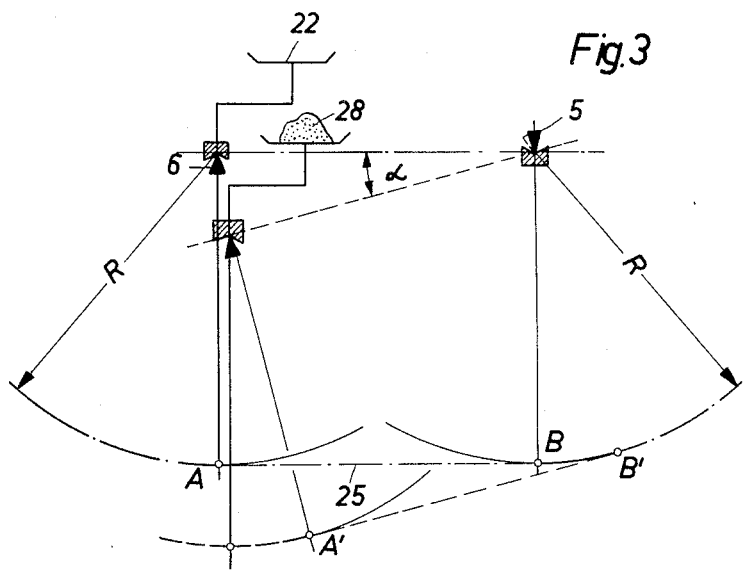
Figure 4:
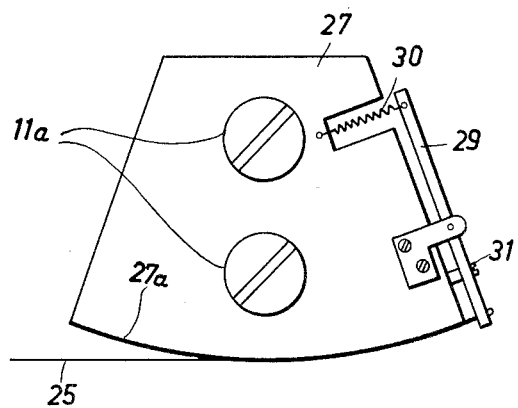

FIGURE 3 schematically illustrates a displacement diagram of the weighing apparatus of FIGURE 2; and FIGURE 4 illustrates in enlarged view a roll-off or roller element of the weighing apparatus of FIGURE 2.

Figure 1:
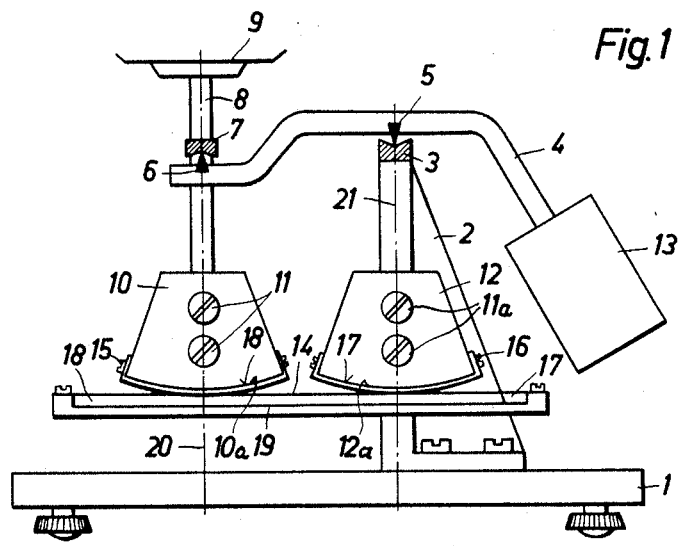
FIGURE 1 is a schematic representation in front view of a weighing apparatus designed according to the teachings of the present invention provided with tension-pressure guides.

Describing now the drawings, in the embodiment of weighing apparatus according to FIGURE 1, a housing upright or stand 2 is mounted upon a base plate 1, the aforesaid upright being provided with a knife or blade support bracket 3. A balance beam or arm 4 supports itself at the support barcket 3 by means of a supporting knife or blade edge 5. This balance beam 4 is provided with a weight or load knife edge 6 upon which rests a grooved bracket 7 of a bowl carrier 8. This bowl carrier 8 is provided with a receiving pan or bowl 9. A roll-off or roller element 10 is adjustably connected by means of screws 11 or equivalent fastening expedients to the lower end of this bowl carrier 8.

A roll-off or roller element 12, corresponding to the roller element 10, is likewise adjustably threadably connected, as by screws 11a to the upright or stand 2. An inclination weight 13 is arranged at the free end of the balance beam 4 by means of which such balance beam can be balanced. The inclination or slope of the balance beam 4, due to a load placed upon the bowl 9, is mechanically or optically measured or indicated in any suitable manner known to the art, and for such reason not further indicated.

In order to prevent a rotation or tilting of the bowl carrier 8 about the point of rotation or fulcrum of the load knife edge 6 due to eccentric loading of this bowl 8, a so-called guide is arranged at the lower end of bowl carrier 8. This guide, in the present embodiment, incoporates a flexible tension element, preferably consisting of a thin wire 14, suspended between the roll-off or roller elements 10 and 12 by means of retaining screws 15 and 16, respectively. The roll-off or roller elements 10 and 12 are advantageously sectors of a curved piece or member. The guide wire or rod 14 with elevational shifting or displacement of the roll-off element 10 can roll-off the roll-off curves 10a and 12a of both roll-off elements 10 and 12 respectively. In order that the guide 14 cannot only take-up right-hand or clockwise moments at the bowl carrier 8 there are provided two further flexible tension elements, preferably wires or rods 17 and 18 arranged in the manner that they wind-up and wind-off the curves 10a and 12a of the roll-off elements 10 and 12 respectively, and opposite to the guide wire means 14. The free ends of the wires 17 and 18 are fixedly clamped to a suspension or spanning member 19 which can be a ledge or a bar. By virtue of this arrangement the vertical axis 20 through the center of the beam carrier 8 is parallely guided to the vertical axis 21 through the fulcrum of the supporting knife edge 5 of the balance beam 4.

A more simplified physical construction of the guide is shown in the embodiment of weighing apparatus depicted in FIGURE 2, wherein for convenience like references numerals have generally been employed for the same or analogous elements. In this case, the bowl or receiving pan 22 is displaced or offset with respect to the axis 23 of the bowl carrier 24 in such a manner that the guide wire 25 is only subjected to tension. It is, therefore, sufficient to use a doubled guide wire which extends from the roll-off or roller element 26 to the roll-off or roller element 27, being connected thereto by fastening means 35 and 36 respectively. If, as depicted in FIGURE 3, the bowl 22 is loaded with a weight or load 28, then the balance beam 4 is for example displaced counterclockwise through the angle α. If according to the preferred construction the roll-off curves 26a and 27a of the roll-off or roller elements 25 and 27 respectively, are curves of the same dimension possessing the radius R and if the center point of the roll-off curves 26a and 27a are located at the fulcrum of the load knife edge 6 and the supporting knife edge 5 respectively, then the free portion of the guide rod 25 remains between the tangent points A and B and A' and B' respectively, always parallel to the line between the aforesaid supporting knife edge 5 and the load knife edge 6. The aforenoted parallelism is guaranteed for even then if, for any reason, the guide wire 25 should experience an elongation, for example due to elastic stretching. The retention of this parallelism is particularly important if the deviation of the balance beam 4 should be independent of the effective line of the weight of the applied load 28.

In order to achieve an exact parallelism it is advantageous to work the roll-off curves in the same setting or mounting with the production of pairs of roll-off or roller elements. Possibly appearing small deviations in the curve-shape are then compensated or balanced, so that the parallelism is always retained. By virtue of the adjustable arrangement of the roll-off elements 10, 26 and 12, 27 at their respective carriers or supports 8, 24 and 2 respectively, it is possible to adjust the center point of the radius or curvature exactly at the point of rotation or fulcrum of the associated load knife edge 6 and supporting knife edge 5.

In FIGURE 4 there is shown an arrangement by means of which the guide rod 25 can be stretched through the agency of a tensioning lever 29 rotatably arranged at the roll-off element 27 and a spring 30. The spring 30 presses the lever 29 against a stop member 31 provided at the roll-off element 27. The spring member 30 is pre-stressed, so that the tensioning lever 29 moves clockwise first when the tension in the guide wire 25 has exceeded a given value.

A bolt 32 is secured to the end of the bowl carrier 24 (FIGURE 2) which moves in a terminating or limiting means, such as aperture 33, of an angle piece 34 secured to the support plate 1. If, in consequence of too great a loading of the bowl 22 the guide wire 25 is stressed beyond the pre-loading adjusted by means of the spring 30, then the belt 32 bears against the limiting means 33 of the angle member 34, so that the guide wire 25 is protected from further loading and eventual damage.

While there is shown and described present preferred embodiments of the invention it is to be distinctly understood that the invention is not limited thereto but may be otherwise variously embodied and practised within the scope of the following claims.

What is claimed is:

1. A weighing apparatus comprising an upper bowl, a bowl carrier for carrying said upper bowl, a balance beam for supporting said bowl carrier, a supporting knife edge and a load knife edge provided for said balance beam, flexible guide means for guiding said bowl carrier, a housing, a roll-off element provided for said housing, a roll-off element provided for said bowl carrier, said flexible guide means being secured to said roll-off element of said housing and said roll-off element of said bowl carrier, each of said roll-off elements being sectors of a curved member and possess a respective roll-off curve, the roll-off curve of the roll-off element of said housing possessing a center point located at the fulcrum of said supporting knife edge and the roll-off curve of the roll-off element of said bowl carrier possessing a center point located at the fulcrum of said load knife edge.

2. A weighing apparatus according to claim 1, wherein said roll-off elements possess circular-shaped roll-off curves of equal diameter.

3. A weighing apparatus according to claim 1, including means for protecting said guide means from overload.

4. A weighing apparatus according to claim 3, further including limiting means adjusted with play cooperating with said bowl carrier, said protecting means incorporating elastic members, said guide means being connected to said elastic members such that said bowl carrier with externally effected deflections first comes to bear at said limiting means, whereby said elastic members yield.

5. A weighing apparatus according to claim 1 wherein said guide means comprises at least one thin wire of substantially round cross-section.

6. A weighing apparatus according to claim 1 wherein both of said roll-off elements are of substantially similar construction.

7. A weighing apparatus comprising an upper bowl, a bowl carrier for carrying said upper bowl, a balance beam for supporting said bowl carrier, flexible guide means for guiding said bowl carrier, a housing, a roll-off element provided for said housing, a roll-off element provided for said bowl carrier, said flexible guide means being secured to said roll-off element of said housing and said roll-off element of said bowl carrier, each of said roll-off elements being sectors of a curved member, a counter-guide cooperating with each roll-off element which rolls-off its associated roll-off element opposite to said guide means, and a spanning member to which are connected a respective free end of said counter guides.

8. A weighing apparatus according to claim 7; wherein the other end of each counter-guide is connected with its associated roll-off element.

9. A weighing apparatus comprising an upper bowl, a bowl carrier for carrying said upper bowl, a balance beam for supporting said bowl carrier, a supporting knife edge and a load knife edge provided for said balance beam, flexible guide means for guiding said bowl carrier, a housing, a roll-off element provided for said housing, a roll-off element provided for said bowl carrier, said flexible guide means being secured to said roll-off element of said housing and said roll-off element of said bowl carrier, each of said roll-off elements being sectors of a curved member and possessing a respective roll-off curve, the roll-off curve of the roll-off element of said housing possessing a center point located at the fulcrum of said supporting knife edge and the roll-off curve of the roll-off element of said bowl carrier possessing a center point located at the fulcrum of said load knife edge, and means for adjustably mounting each of said roll-off elements such that the respective center point of each roll-off element is adjustable with respect to its associated knife edge.

10. A weighing apparatus comprising an upper bowl, a bowl carrier for carrying said upper bowl, a balance beam for supporting said bowl carrier, flexible guide means for guiding said bowl carrier, a housing, a roll-off element provided for said bowl carrier, said flexible guide means being secured to said roll-off element of said housing and said roll-off element of said bowl carrier, each of said roll-off elements being sectors of a curved member, means for protecting said guide means from overload, limiting means adjusted with play cooperating with said bowl carrier, said protecting means incorporating elastic members, said guide means being connected to said elastic members such that said bowl carrier with externally effected deflections first comes to bear at said limiting means, whereby said elastic members yield, said elastic members comprising a pivotably mounted tensioning lever and a spring acting upon said tensioning lever.

11. A weighing apparatus according to claim 10; wherein said spring is pre-stressed.

References Cited by the Examiner

UNITED STATES PATENTS

| | | | |
|---|---|---|---|
| 128,397 | 6/1872 | Holmes | 177—236 |
| 844,440 | 2/1907 | Braun | 177—246 |
| 2,013,937 | 9/1935 | Williams | 177—255 X |
| 2,919,124 | 12/1959 | Ecker | 177—198 X |

FOREIGN PATENTS

| | | |
|---|---|---|
| 266,862 | 3/1927 | Great Britain. |
| 960,656 | 6/1964 | Great Britain. |
| 450,441 | 7/1949 | Italy. |

LEO SMILOW, *Primary Examiner.*